US009123462B2

(12) United States Patent
Ueshima et al.

(10) Patent No.: US 9,123,462 B2
(45) Date of Patent: Sep. 1, 2015

(54) MAGNETO-RHEOLOGICAL FLUID AND CLUTCH USING THE SAME

(71) Applicant: Kurimoto, Ltd., Osaka (JP)

(72) Inventors: Yuya Ueshima, Osaka (JP); Shuichi Akaiwa, Osaka (JP); Junichi Noma, Osaka (JP)

(73) Assignee: KURIMOTO, LTD., Osaka (JP)

( * ) Notice: Subject to any disclaimer, the term of this patent is extended or adjusted under 35 U.S.C. 154(b) by 124 days.

(21) Appl. No.: 13/973,259

(22) Filed: Aug. 22, 2013

(65) Prior Publication Data

US 2013/0341145 A1    Dec. 26, 2013

Related U.S. Application Data

(63) Continuation of application No. PCT/JP2012/001408, filed on Mar. 1, 2012.

(30) Foreign Application Priority Data

Mar. 8, 2011   (JP) ................................. 2011-050445

(51) Int. Cl.
| | |
|---|---|
| *H01F 1/44* | (2006.01) |
| *F16D 35/00* | (2006.01) |
| *F16D 37/00* | (2006.01) |
| *F16D 37/02* | (2006.01) |

(52) U.S. Cl.
CPC .............. *H01F 1/447* (2013.01); *F16D 37/008* (2013.01); *F16D 37/02* (2013.01); *F16D 2037/005* (2013.01)

(58) Field of Classification Search
CPC ............................... H01F 1/447; F01D 37/008
USPC ................ 192/21.5, 58.41; 252/62.52, 62.56, 252/62.55
See application file for complete search history.

(56) References Cited

U.S. PATENT DOCUMENTS

| | | | |
|---|---|---|---|
| 5,525,249 A * | 6/1996 | Kordonsky et al. ........ 252/62.56 |
| 5,540,053 A | 7/1996 | Graichen | |
| 5,549,837 A * | 8/1996 | Ginder et al. ............. 252/62.52 |
| 5,900,184 A | 5/1999 | Weiss et al. | |
| 2002/0166745 A1 * | 11/2002 | Szalony ....................... 192/21.5 |
| 2013/0341145 A1 | 12/2013 | Ueshima et al. | |

FOREIGN PATENT DOCUMENTS

| | | |
|---|---|---|
| JP | 56-118496 A | 9/1981 |
| JP | 07-505978 A | 6/1995 |
| JP | H07-507978 A | 9/1995 |
| JP | 11-513192 A | 11/1999 |
| JP | 2001-267117 A | 9/2001 |
| JP | 2004-076749 A | 3/2004 |
| JP | 2005-206624 A | 8/2005 |
| JP | 2006-274300 A | 10/2006 |
| JP | 2009-117797 A | 5/2009 |
| JP | 2010-101409 A | 5/2010 |
| JP | 2010-212580 A | 9/2010 |
| JP | 2013-181598 A | 9/2013 |
| WO | WO 93/21644 A1 | 10/1993 |
| WO | WO 97/15058 A1 | 4/1997 |
| WO | WO 2012/120842 A1 | 9/2012 |

OTHER PUBLICATIONS

International Searching Authority, International Search Report (ISR) and Written Opnion for International Application No. PCT/JP2012/001408, mailed Jun. 5, 2012, 9 pages, Japan Patent Office, Japan.
Viota, J. L., et al., "Study of the Magnetorheology of Aqueous Suspensions of Extremely Bimodal Magnetite Particles," *The European Physical Journal E*, May 10, 2009, pp. 87-94, vol. 29, Springer-Verlag, Germany.

* cited by examiner

*Primary Examiner* — Carol M Koslow
(74) *Attorney, Agent, or Firm* — Alston & Bird LLP

(57) ABSTRACT

A magneto-rheological fluid includes: a magnetic particle mixture; and a dispersion medium in which the magnetic particle mixture is dispersed. The magnetic particle mixture includes first magnetic particles and second magnetic particles. The first magnetic particles have an average particle size greater than or equal to 1 μm and less than or equal to 50 μm. The second magnetic particles have an average particle size greater than or equal to 20 nm and less than or equal to 200 nm, and have surfaces provided with a surface modified layer. A proportion of the second magnetic particles in the magnetic particle mixture is greater than or equal to 2 wt % and less than or equal to 10 wt %.

10 Claims, 5 Drawing Sheets

MAGNETO-RHEOLOGICAL FLUID AND CLUTCH USING THE SAME

CROSS REFERENCE TO RELATED APPLICATIONS

This application is a continuation of International Application No. PCT/JP2012/001408, filed Mar. 1, 2012, which claims priority to and the benefit of Japanese Application No. 2011-050445, filed Mar. 8, 2011, the contents of both of which are hereby incorporated by reference in their entirety.

BACKGROUND

1. Technical Field

The present disclosure relates to magneto-rheological fluids and clutches using the magneto-rheological fluids, and more particularly to a magneto-rheological fluid for use at high shearing speed and a clutch using the magneto-rheological fluid.

2. Related Art

A magneto-rheological (MR) fluid is a type of fluid in which magnetic particles of, e.g., iron (Fe) are dispersed in a dispersion medium such as oil. Under no influence of a magnetic field, magnetic particles are suspended randomly in the dispersion medium in the MR fluid. In the presence of an externally applied magnetic field to the MR fluid, the magnetic particles form a large number of clusters along the direction of the magnetic field, and the yield stress increases. Thus, the MR fluid is a material whose rheological properties or mechanical properties can be easily controlled by using an electrical signal, and thus, application of the MR fluid to various fields has been studied. The MR fluid is currently principally used for direct drive devices such as shock absorbers for automobiles and seat dampers for construction machinery.

Magnetic particles typically used in an MR fluid have an average particle size of several micrometers to several tens of micrometers. A magnetic fluid is another type of fluid in which magnetic particles are dispersed in a dispersion medium such as oil, as well as an MR fluid. Magnetic particles for use in the magnetic fluid have particle sizes of about several nanometers to 10 nm, and are caused to vibrate by Brownian motion resulting from thermal energy. Thus, magnetic particles do not form clusters even in the presence of an applied magnetic field to the magnetic fluid and the yield stress does not increase. In this aspect, the magnetic fluid completely differs from the MR fluid. The MR fluid uses particles larger than those used in the magnetic fluid, in order to form clusters. Thus, when the MR fluid is left untreated, caking occurs due to sedimentation of magnetic particles. In addition, repetitive application and cancel of a magnetic field causes secondary agglomeration of magnetic particles, resulting in failure of maintenance of a stable dispersion state.

As a technique for enhancing stability of an MR fluid, inventors of the present disclosure filed a patent application (e.g., Japanese Patent Publication No. 2009-117797) for an MR fluid including nano-sized magnetic particles whose average particle size ranges several tens of nanometers to several hundred of nanometers. The nano-size of magnetic particles reduces sedimentation and secondary agglomeration of the magnetic particles.

BRIEF SUMMARY

However, application of a conventional MR fluid to, e.g., a rotary clutch involves a problem of a significant increase in shearing stress in a region where the high shearing speed is high (hereinafter also referred to as a high shearing speed region). Industrial equipment needs to rotate at high speed in general. Thus, a medium that conveys a torque in, e.g., a clutch of industrial equipment needs to prevent a significant increase in shearing stress in a high shearing speed region. However, the conventional MR fluid significantly increases the shearing stress as the shearing speed increases, and consequently, a rotating torque increases in high-speed rotation. Thus, it is difficult to use the conventional MR fluid for, e.g., a clutch of industrial equipment that needs to rotate at high speed.

It is therefore an object of the present disclosure to provide a magneto-rheological fluid that reduces sedimentation and secondary agglomeration of magnetic particles and shows low shearing stress in a high shearing speed region.

To achieve the object, a magneto-rheological fluid according to the present disclosure includes a mixture of typically employed micron-sized magnetic particles and nano-sized magnetic particles.

Specifically, an example magneto-rheological fluid according to the present disclosure includes: a magnetic particle mixture; and a dispersion medium in which the magnetic particle mixture is dispersed, wherein the magnetic particle mixture includes first magnetic particles and second magnetic particles, the first magnetic particles have an average particle size greater than or equal to 1 µm and less than or equal to 50 µm, the second magnetic particles have an average particle size greater than or equal to 20 nm and less than or equal to 200 nm, and a proportion of the second magnetic particles in the magnetic particle mixture is greater than or equal to 2 wt % and less than or equal to 10 wt %.

The magneto-rheological fluid includes a mixture of the first magnetic particles having an average particle size greater than or equal to 1 µm and less than or equal to 50 µm and the second magnetic particles having an average particle size greater than or equal to 20 nm and less than or equal to 200 nm. Thus, occurrence of sedimentation and secondary agglomeration can be reduced. In addition, since proportion of the second magnetic particles in the magnetic particle mixture is greater than or equal to 2 wt % and less than or equal to 10 wt %, the shearing stress is low in a region where the shearing speed is low, and in addition, an increase in shearing stress can be reduced in a high shearing speed region.

In the magneto-rheological fluid, the first magnetic particles may be carbonyl iron powder, and the second magnetic particles may be iron particles produced by an arc plasma process. Alternatively, the second magnetic particles may be magnetite particles.

In the magneto-rheological fluid, the second magnetic particles may have surfaces provided with a surface modified layer. In this case, the surface modified layer may include a compound having a hydrocarbon chain bonded to the surfaces of the second magnetic particles.

An example clutch according to the present disclosure includes: a first member and a second member which are configured to rotate relative to each other; a magneto-rheological fluid filling a gap between the first member and the second member; and a magnetic field generator configured to apply a magnetic field to the magneto-rheological fluid, wherein the magneto-rheological fluid is the magneto-rheological fluid described above.

An example magneto-rheological fluid according to the present disclosure can reduce sedimentation and secondary agglomeration, for example, of magnetic particles, shows low shearing stress in a high shearing speed region, and is applicable to clutches and other devices.

BRIEF DESCRIPTION OF THE SEVERAL VIEWS OF THE DRAWING(S)

DETAILED DESCRIPTION OF VARIOUS EMBODIMENTS

Figure 1:
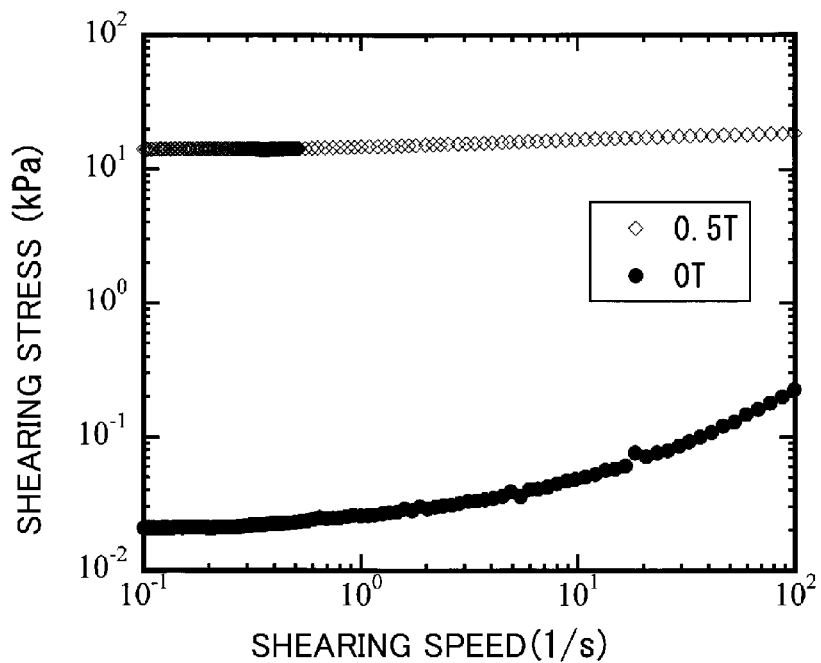
FIG. 1 is a graph showing a result of shearing stress evaluation on iron nanoparticles.

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

A magneto-rheological (MR) fluid according to an embodiment includes: a magnetic particle mixture of first magnetic particles and second magnetic particles; and a dispersion medium in which the magnetic particle mixture is dispersed. The first magnetic particles have an average particle size of about 1-50 μm, which is typical of MR fluids, and preferably have an average particle size of about 1-10 μm.

The first magnetic particles may be made of any material as long as the magnetic particles have an appropriate average particle size, and may be made of iron, iron nitride, iron carbide, carbonyl iron, chromium dioxide, low-carbon steel, nickel, or cobalt, for example. The first magnetic particles may also be made of an iron alloy such as an aluminium-containing iron alloy, a silicon-containing iron alloy, a cobalt-containing iron alloy, a nickel-containing iron alloy, a vanadium-containing iron alloy, a molybdenum-containing iron alloy, a chromium-containing iron alloy, a tungsten-containing iron alloy, a manganese-containing iron alloy, or a copper-containing iron alloy. Paramagnetic, superparamagnetic, or ferromagnetic compound particles of gadolinium, an organic derivative of gadolinium or particles of a mixture thereof may also be used. Among them, carbonyl iron is preferable because particles having an average particle size suitable for the first magnetic particles are easily obtained.

The second magnetic particles may have any average particle size as long as the average particle size of the second magnetic particles is smaller than that of the first magnetic particles. However, an excessively small average particle size does not form a cluster even in the presence of an applied magnetic field, and does not contribute to the function as an MR fluid. Thus, in view of cluster formation, the average particle size of the second magnetic particles is 20 nm or more, preferably 50 nm or more, more preferably 70 nm or more, and more preferably 90 nm or more. On the other hand, an excessively large average particle size increases the possibility of particle sedimentation, and reduces the advantage of enhancing stability of the MR fluid. Thus, in view of sedimentation reduction, the average particle size of the second magnetic particles is 200 nm or less, and preferably 100 nm or less. In consideration of the above, the average particle size of the second magnetic particles is in the range of about 20-200 nm, and preferably in the range of about 50-100 nm.

Similarly to the first magnetic particles, the second magnetic particles may be made of any material as long as the second magnetic particles have an appropriate average particle size. In particular, iron particles produced by an arc plasma process are preferable because the iron particles can be easily formed to have an average particle size appropriate for the second magnetic particles. In addition, particles of magnetite, which is a complex oxide including divalent iron and trivalent iron, are preferable because magnetite particles can be easily formed to have an average particle size appropriate for the second magnetic particles. The second magnetic particles preferably have a surface modified layer on their surfaces in order to reduce the base viscosity and enhance stability of the MR fluid. The presence of the surface modified layer that enhances hydrophobicity (lipophilicity) of the particle surfaces can reduce the base viscosity and ease dispersion in the dispersion medium.

FIG. 1 shows a result of actual measurement of shearing stress on iron particles having an average particle size of 47 nm. The measurement employed a commercially available rotational viscometer (HAAKE Corp., RheoStress 600) and a commercially available magnetic field generator (Eko Instruments Co. Ltd., MR-100N). The iron particles were produced by an arc plasma process, a surface modified layer was formed using methyltrimethoxysilane (Shin-Etsu Chemical Co., Ltd., KBM-13). The average particle size was measured by a brunauer-emmett-teller (BET) technique. In this measurement, the particle concentration was 67 wt %, silicon oil (Shin-Etsu Chemical Co., Ltd., KF-96-50cs) was used as a dispersion medium, and the gap of a rotational viscometer was 0.5 mm. As shown in FIG. 1, in the presence of an applied magnetic field of 0.5 T (tesla), a shearing stress increased to about 15-20 kPa, although the shearing stress was about 0.02-0.2 kPa in the absence of a magnetic field. In this manner, it was confirmed that iron particles having an average particle size of about 50 nm formed clusters to be an MR fluid in the presence of an applied magnetic field. Similarly, it was also confirmed that particles having an average particle size of about 100 nm become an MR fluid.

The dispersion medium may be of any type as long as a magnetic particle mixture can be dispersed therein. For example, silicon oil, fluorine oil, polyalphaolefin, paraffin, ether oil, ester oil, mineral oil, vegetable oil, animal oil, etc. may be used. Alternatively, an organic solvent such as toluene, xylene, or hexane, or ionic liquid (room temperature molten salt) typified by ethylmethylimidazolium salt, 1-butyl-3-methylimidazolium salt, 1-methylpyrazolium salt, etc. may be used, for example. These materials may be used alone or two or more of them may be used in combination. As long as the surface modified layer has an affinity for water, water, for example, may be used as a dispersion medium.

The proportion of the first magnetic particles in the magnetic particle mixture is preferably about 90-98 wt %, and the proportion of the second magnetic particles in the magnetic particle mixture is preferably about 2-10 wt %. Mixing of these proportions of the first magnetic particles and the second magnetic particles can reduce the base viscosity in the absence of an applied magnetic field to the MR fluid, and also reduce shearing stress in a high shearing speed region.

Addition of the second magnetic particles can advantageously reduce sedimentation of the magnetic particle mixture. To reduce sedimentation of the magnetic particle mixture, the proportion of the second magnetic particles is as high as possible. However, as described above, when the proportion of the second magnetic particles is excessively high, shearing stress in a low shearing speed region becomes high. Thus, the proportion of the weight of the second magnetic particles to the total weight of the first and second magnetic particles may be 2-10 wt %, and preferably 5-10 wt %.

The concentration of the magnetic particle mixture in the dispersion medium is about 15-50 vol %. When the concentration of the magnetic particle mixture is excessively low, the magnetic particle mixture does not function as an MR fluid. On the other hand, since the base viscosity of an MR fluid increases with an increase in the concentration of the magnetic particle mixture increases, the concentration of the magnetic particle mixture in the dispersion medium is preferably about 15-30 vol %.

Figure 2:
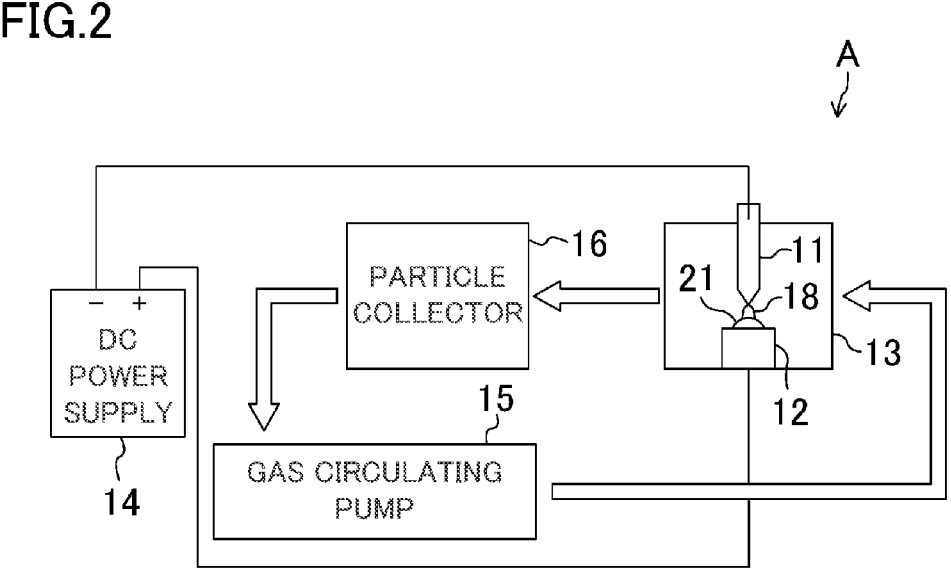
FIG. 2 is a block diagram illustrating a system for producing metal particles used in an embodiment.

The second magnetic particles may be produced in, for example, the following manner. FIG. 2 schematically illustrates a system A for producing nano-sized metal particles with an arc plasma process. In the system A, a plasma torch 11 including a tungsten electrode and a water-cooled copper hearth 12 on which a metal material 21 is placed face each other in a container 13. A direct-current (DC) power supply 14 is connected between the plasma torch 11 serving as a cathode and the water-cooled copper hearth 12 serving as an anode.

First, a hydrogen atmosphere or a gas mixture atmosphere including an inert gas and a diatomic molecule gas, e.g., hydrogen or nitrogen, or another polyatomic molecule gas was created in the container 13, and arc plasma 18 is generated therein. The arc plasma 18 causes the metal material 21 placed on the water-cooled copper hearth 12 to evaporate. The evaporated metal material is cooled to be nano-sized metal particles. The metal particles are sucked by a gas circulating pump 15, and collected by a particle collector 16 coupled to the container 13. The gas discharged from the gas circulating pump 15 returns to the container 13.

After generation of metal particles, the atmosphere in the system A is changed to a gas mixture of several percent of oxygen and a non-oxidizing gas, and is left untreated for several hours. Then, an oxide film with a thickness of about 2-10 nm is formed on the surfaces of the metal particles collected by the particle collector 16. The oxide film does not grow any more even if the system A is left for a further period. Formation of the oxide film can reduce combustion of nano-sized metal particles when the nano-sized metal particles are taken out to the air.

The second magnetic particles may be of another type as long as the second magnetic particles have a predetermined particle size. For example, magnetite particles may be used. The magnetite particles may be commercially available particles or may be produced by a known technique.

The surfaces of the second magnetic particles, which are fine metal particles, are preferably provided with a surface modified layer. Metal particles provided with an oxide film are taken out of the system A, and then are left in the air at an ordinary temperature for a predetermined period, thereby introducing a hydroxy group into the surfaces of the metal particles. Thereafter, the hydroxy group on the surfaces of the metal particles is caused to react with, for example, a silane coupling agent. In this manner, second magnetic particles whose surfaces are provided with a hydrophobic surface modified layer. The surface modified layer is preferably uniformly formed on the surfaces of the second magnetic particles, but may be formed on at least a part of the surfaces of the second magnetic particles.

The silane coupling agent used for forming the surface modified layer is not specifically limited as long as the silane coupling agent includes a hydrolyzable group, e.g., a methoxy group or an ethoxy group, that reacts with the hydroxy group formed on the surfaces of the metal particles. The coupling agent is not limited to the silane coupling agent and may be another coupling agent as long as the coupling agent reacts with the hydroxy group. To make the surfaces of the second magnetic particles hydrophobic by using the surface modified layer, a coupling agent including only hydrocarbon chains, e.g., methyltriethoxysilane or methyltrimethoxysilane, is preferably used. After coupling the silane coupling agent including a reactive functional group, a hydrophobic compound may be fixed using the reactive functional group. A functional group having a high affinity for the dispersion medium may be introduced depending on the type of the dispersion medium. Coupling reaction preferably occurs in a gas phase rather than in a liquid phase because agglomeration of the second magnetic particles can be reduced.

The magnetic particles are preferably deagglomerated after formation of the surface modified layer. The deagglomeration is performed with a known technique such as a grinder (e.g., a ball mill). Deagglomeration with a grinder enables accurate control of the average particle size of the second magnetic particles to a predetermined size or less. The deagglomeration of the second magnetic particles may not be performed.

The first and second magnetic particles and the dispersion medium are preferably mixed together with, for example, a spatula, and then subjected to full high-shear mixing with, for example, a planetary centrifugal mixer. After dispersion of the first magnetic particles in the dispersion medium, the second magnetic particles may be dispersed on the dispersion medium. Alternatively, after dispersion of the second magnetic particles, the first magnetic particles may be dispersed in the dispersion medium. Instead of the mixer, a homogenizer or a planetary mixer may be used to disperse magnetic particles. For easier dispersion, not only the second magnetic particles but also the first magnetic particles may be provided with a surface modified layer similar to that provided on the second magnetic particles. The magnetic particles may be dispersed by adding a dispersing agent, for example.

Figure 3:
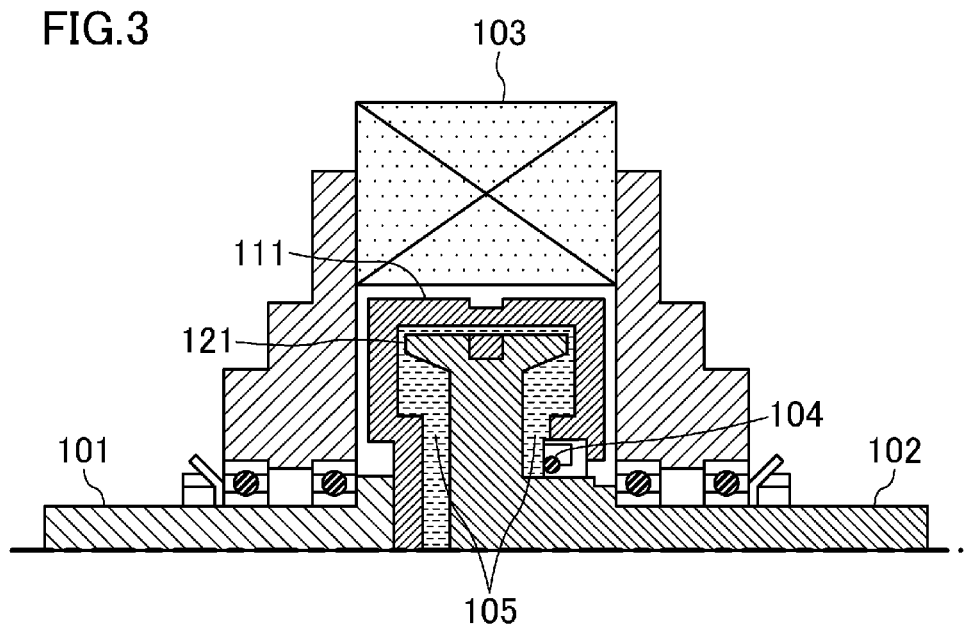
FIG. 3 is a cross-sectional view illustrating an example of a clutch using an MR fluid according to the embodiment.

The MR fluid of this embodiment may be applied to, for example, a clutch as illustrated in FIG. 3. The clutch includes an input shaft 101, an output shaft 102, and an electromagnet 103 surrounding the input and output shafts 101 and 102 and serving as a magnetic field generator. An outer cylinder 111 is fixed to an end of the input shaft 101, and a rotor 121 is fixed to an end of the output shaft 102. The outer cylinder 111 surrounds the rotor 121 such that the outer cylinder 111 and the rotor 121 are disposed to rotate relative to each other. An oil seal 104 is provided to seal the space inside the outer cylinder 111. A gap is present between the outer cylinder 111 and the rotor 121, and upon rotation, is filled with an MR fluid 105 by a centrifugal force. When the electromagnet 103 generates a magnetic field, magnetic particles in the MR fluid form clusters along the lines of magnetic flux, and a torque is transmitted between the outer cylinder 111 and the rotor 121 through the clusters.

The MR fluid of this embodiment may be applied to a torque control device such as a brake as well as the clutch. In particular, the MR fluid of this embodiment may be used for devices to which a high shearing speed is applied.

Properties of the MR fluid will be more specifically described using examples.

First Evaluation

As first magnetic particles, carbonyl iron powder (New Metals and Chemicals Corporation, Ltd., UN3189) having an average particle size of 6.0 µm was used. As second magnetic particles, Fe nanoparticles having an average particle size of 0.1 µm and produced in the manner described below were used. The average particle size was obtained by a brunauer-emmett-teller (BET) technique.

First, the container 13 was filled with a gas mixture of hydrogen and argon such that an atmospheric pressure is created therein. The partial pressures of hydrogen and argon were 0.5 atm. The DC power supply 14 supplied a current of 150 A at 40V between the plasma torch 11 (the cathode) and the metal material 21 (the anode) placed on the water-cooled copper hearth 12, thereby generating arc plasma 18. As a metal material 21, pure iron (with a purity of 99.98%, produced by Sigma-Aldrich Co. LLC) was used. The generation rate of iron particles was about 0.8 g/min.

After generation of the iron particles, a dry air (nitrogen 80%, oxygen 20%) atmosphere containing 5% of argon was created in the container 13 and the particle collector 16, and the container 13 and the particle collector 16 were left untreated for three hours. In this manner, an oxide film with a thickness of about 2-10 nm was formed on the surfaces of the iron particles. The formation of the oxide film was observed with a transmission electron microscope (TEM). After the three-hour leaving, the thickness of the oxide film hardly changed.

The iron particles provided with the oxide film were taken out of the system A, and left untreated for one hour in the air at an ordinary temperature, thereby introducing a hydroxy group into the surfaces of the iron particles. The iron particles with surfaces into which the hydroxy group has been introduced and a silane coupling agent were placed in a pressure vessel, and the pressure vessel was hermetically sealed. The silane coupling agent was methyltrimethoxysilane (Shin-Etsu Chemical Co., Ltd., KBM-13). The silane coupling agent was placed in an open container such as a beaker such that the iron particles and the silane coupling agent were not directly mixed together. The weight of the silane coupling agent was 0.38 g per 10 g of the iron particles. The pressure vessel containing the iron particles and the silane coupling agent was left untreated for two hours in a drying furnace at 80° C. such that the silane coupling agent was vaporized in the pressure vessel. The vaporized silane coupling agent reacted with the hydroxy group in the surfaces of the iron particles, thereby obtaining second magnetic particles whose surfaces were provided with a surface modified layer.

After the formation of the surface modified layer, the second magnetic particles were dispersed in toluene, and deagglomerated using a ball mill for six hours. A zirconia pod having a capacity of 1 L was used as the pod of the ball mill, and balls each having a diameter of 1 mm were used as the balls of the ball mill.

The first magnetic particles and the second magnetic particles that are mixed together at a predetermined ratio were dispersed in a dispersion medium, thereby obtaining five types of MR fluids A-E shown in Table 1. The dispersion medium was silicon oil (Shin-Etsu Chemical Co., Ltd., KF-96-50cs). Predetermined amounts of the first magnetic particles, the second magnetic particles, and the dispersion medium were mixed in a container with hands using a spatula, and then subjected to high shear mixing with a planetary centrifugal mixer (KURABO INDUSTRIES LTD., MAZERUSTAR), thereby dispersing the magnetic particles in the dispersion medium.

TABLE 1

| | SECOND MAGNETIC PARTICLE PERCENTAGE (wt %) | FRACTIONAL PACKING DENSITY |
|---|---|---|
| A | 0 | 0.52 |
| B | 2.0 | 0.49 |
| C | 5.0 | 0.43 |
| D | 10.0 | 0.28 |
| E | 20.0 | 0.20 |

The concentration of a magnetic particle mixture of the first magnetic particles and the second magnetic particles in the dispersion medium was 30 vol %. The fractional packing density was obtained by measuring a tap density of the magnetic particle mixture and dividing the tap density by a theoretical density of the magnetic particle mixture. The tap density was measured with a powder characteristic tester (Hosokawa Micron Corporation, POWDER TESTER). The fractional packing density of the second magnetic particles alone was 0.04.

Figure 4:
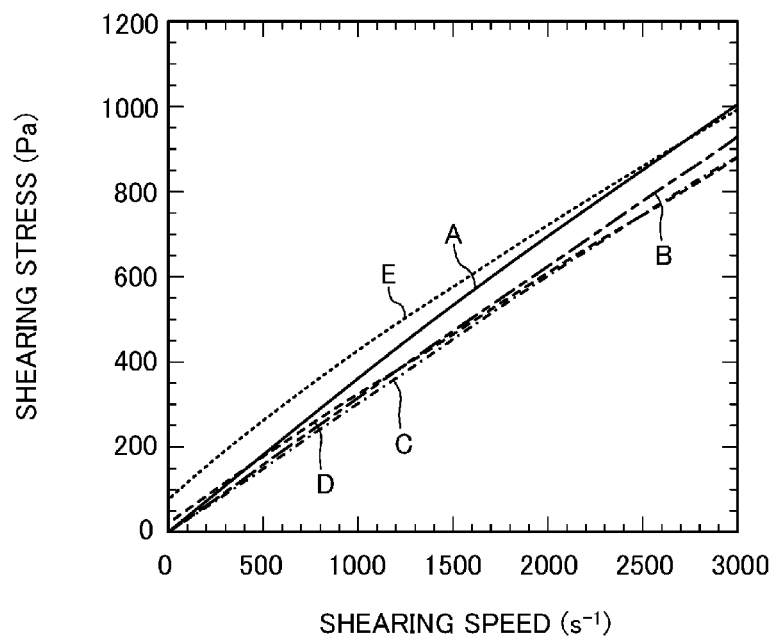
FIG. 4 is a graph showing results of shearing stress evaluation on MR fluids.
Figure 5:
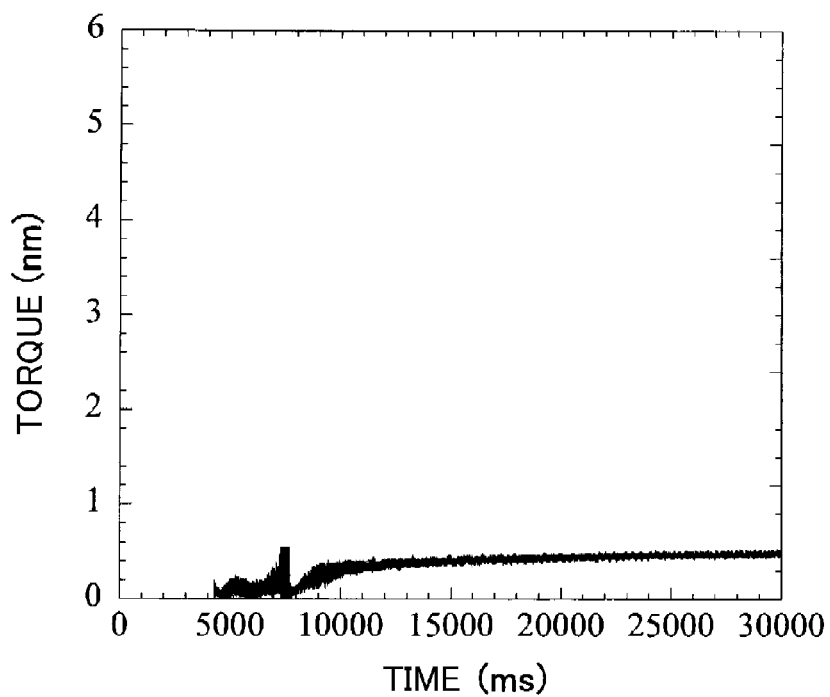
FIG. 5 is a chart showing an example of measurement of a torque of an MR fluid with a rotational viscometer.
Figure 6:
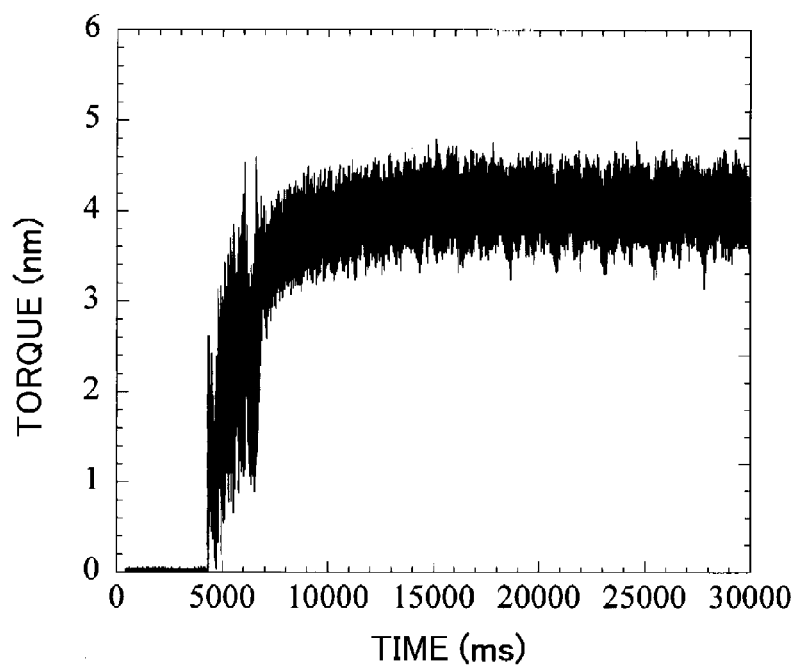
FIG. 6 is a chart showing an example of measurement of a torque of an MR fluid with a rotational viscometer.
Figure 7:
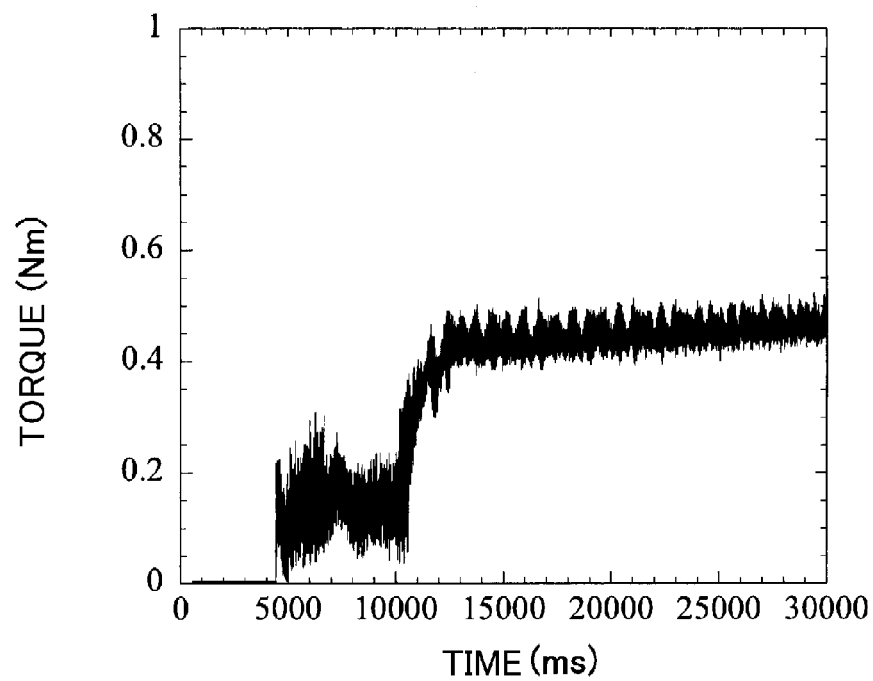
FIG. 7 is a chart showing an example of measurement of a torque of an MR fluid with a rotational viscometer.
Figure 8:
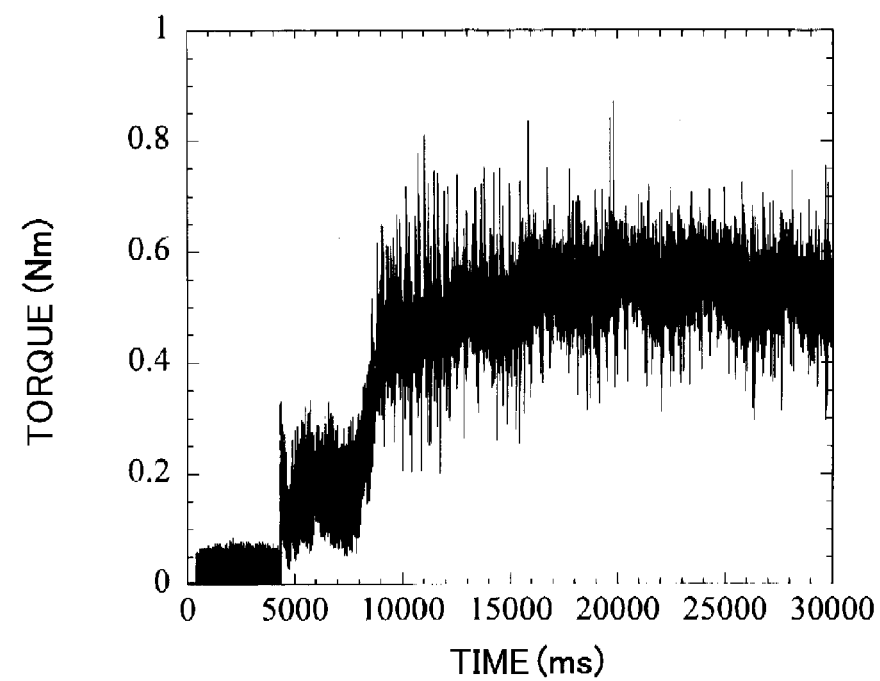
FIG. 8 is a chart showing an example of measurement of a torque of an MR fluid with a rotational viscometer.

FIG. 4 shows evaluation results on viscosities of five types of MR fluids shown in Table 1 in the absence of an applied magnetic field. The viscosities were evaluated with a rotational viscometer (HAAKE Corp., RheoStress 6000). Plates were disposed at a distance of 250 µm, and a shearing stress was measured at a shearing speed of $0 \text{ s}^{-1}$-$3000 \text{ s}^{-1}$.

As shown in FIG. 4, MR fluid A including only the first magnetic particles showed a low shearing stress in a region with a low shearing speed of about $300 \text{ s}^{-1}$. However, as the shearing speed increases, the shearing stress increases to reach about 1000 Pa at $3000 \text{ s}^{-1}$. MR fluids B-D each including a mixture of the first magnetic particles and the second magnetic particles showed shearing stresses slightly higher than that of MR fluid A including only the first magnetic particles, but showed lower increase rates of the shearing stresses with an increase in shearing speed than that of MR fluid A. MR fluid B in which the weight ratio of the second magnetic particles to the total weight of the first and second magnetic particles was 2 wt %, showed a shearing stress of about 900 Pa at $3000 \text{ s}^{-1}$, which is about 10% lower than that of MR fluid A. MR fluid C in which the weight ratio of the second magnetic particles was 5 wt % and MR fluid D in which the weight ratio of the second magnetic particles was 10 wt % showed a shearing stress of about 850 Pa at $3000 \text{ s}^{-1}$, which is about 15% lower than that of MR fluid A. On the other hand, MR fluid E in which the weight ratio of the second magnetic particles was 20 wt % showed a significantly higher shearing stress than that of MR fluid A in a low shearing speed region. Thus, MR fluid E showed an increase rate of the shearing stress lower than that of MR fluid A, but showed a shearing stress at $3000 \text{ s}^{-1}$ substantially equal to that of MR fluid A.

Reduction of an increase rate of the shearing stress with an increase in shearing speed by mixing the nano-sized second magnetic particles in the first magnetic particles having a relatively large particle size is considered to be because the second magnetic particles reduces a dilatant flow that occurs upon application of a high shearing speed. A significant increase in shearing stress under a low shearing speed with an increased ratio of the second magnetic particles is considered to be because of the following reasons. A first reason is that an increase in the ratio of the second magnetic particles having a large specific surface area increases the surface area as the magnetic particle mixture, and thereby, increases a contact area between the magnetic particle mixture and the dispersion medium. As a second reason, entering of the second magnetic particles into the clearance among the first magnetic particles reduces the distance between particles to increase interaction between the particles.

Many rotating devices employed in, for example, industrial equipment are used at revolution speeds of about 1800 rpm. Suppose that a clutch has a rotor diameter of 30 mm and a gap of 1.0 mm, the shearing speed at 1800 rpm is about 3000 $s^{-1}$. Thus, reduction of shearing stress in a high shearing speed region with a shearing speed of about 3000 $s^{-1}$ is significant in using an MR fluid for a clutch of a rotating device employed in, for example, industrial equipment. Reduction of shearing stress under a high shearing speed can reduce the rotor diameter of the clutch and reduces the gap thereof, thereby enabling size reduction of the clutch.

Second Evaluation

A. Evaluation Method

A torque in a high shearing speed region was evaluated using a rotational viscometer produced by KURIMOTO, LTD., which enables measurement at high shearing speeds. The rotational viscometer includes a first disk and a second disk disposed at a predetermined distance from the first disk. The first disk has a groove, and has its rotation shaft coupled to a servomotor. The second disk has a projection at a position facing the groove of the first disk. A torque sensor is attached to the rotation shaft of the second disk. A torque can be measured by rotating the first disk and the second disk relative to each other with an MR fluid being placed in the groove. In the measurement, the distance between the disks was 370 µm, and no magnetic field was applied to the MR fluid. The shearing speed during the measurement was 9000 $s^{-1}$. The shearing speed was obtained from the rotation speed of the second disk measured with a known rotation speed sensor. Rotation of the disks was started four seconds after start of measurement with the torque sensor, and the mean value of the value measured from 15 seconds to 30 seconds after the start of measurement was used as a torque value. The reason for using values after 15 seconds from the start of measurement (i.e., after 11 seconds from the start of rotation) is to stabilize a torque variation resulting from sealing of the system.

B. Preparation of Samples

Using carbonyl iron powder (BASF Corporation, Soft-grade SM) having an average particle size of 2.0 µm as first magnetic particles and Fe nanoparticles having an average particle size of 0.1 µm as second magnetic particles, an MR fluid F was prepared in a manner similar to that in measurement of the shearing stress. The Fe nanoparticles were produced by the same technique as that used for measuring the shearing stress. The weight ratio of the second magnetic particles to the total weight of the first and second magnetic particles was 5 wt %.

MR fluid G was prepared in the same manner as that for MR fluid F except that no second magnetic particles were mixed in MR fluid G.

MR fluid H was prepared in the same manner as that for MR fluid F except for using carbonyl iron powder (BASF Corporation, Softgrade SC) having an average particle size of 6.0 µm as first magnetic particles and magnetite particles (JFE Steel Corporation, sample product) having an average particle size of 0.05 µm as second magnetic particles.

MR fluid I was prepared in the same manner as that for MR fluid H except for mixing no second magnetic particles in MR fluid I.

C. Measurement Result

FIGS. 5-8 show variations of torque over time measured with a rotational viscometer for MR fluids F-I. MR fluids G and I including no second magnetic particles showed large variations of torque than MR fluids F and H.

Table 2 show measured values of torque. The torque of MR fluid F was 0.45 Nm, and the torque of MR fluid G including no second magnetic particles was 4.09 Nm. The torque of MR fluid H was 0.45 Nm, and the torque of MR fluid I including no second magnetic particles was 0.54 Nm. The results clearly shows that addition of the second magnetic particles greatly reduces the torque in a high shearing speed region, independently of the particle size of the first magnetic particles. Addition of iron nanoparticles greatly reduces a variation range of torque.

TABLE 2

| | FIRST MAGNETIC PARTICLE | SECOND MAGNETIC PARTICLE | SECOND MAGNETIC PARTICLE PERCENTAGE | TORQUE |
|---|---|---|---|---|
| F | 2.0 µm | 0.1 µm | 5 wt % | 0.45 Nm |
| G | 2.0 µm | none | 0 wt % | 4.09 Nm |
| H | 6.0 µm | 0.05 µm | 5 wt % | 0.45 Nm |
| I | 6.0 µm | none | 0 wt % | 0.54 Nm |

Third Evaluation

A. Evaluation Method

An MR fluid was placed in a container and allowed to stand for three days. Then, the total height and the height of a supernatant portion were measured, and a sedimentation proportion was calculated using the following equation:

Sedimentation proportion (%)=(total height−height of supernatant portion)/total height×100.

As the sedimentation proportion increases, the degree of sedimentation of the magnetic particles decreases, and an MR fluid becomes more stable.

B. Measurement Result

Figure 9:
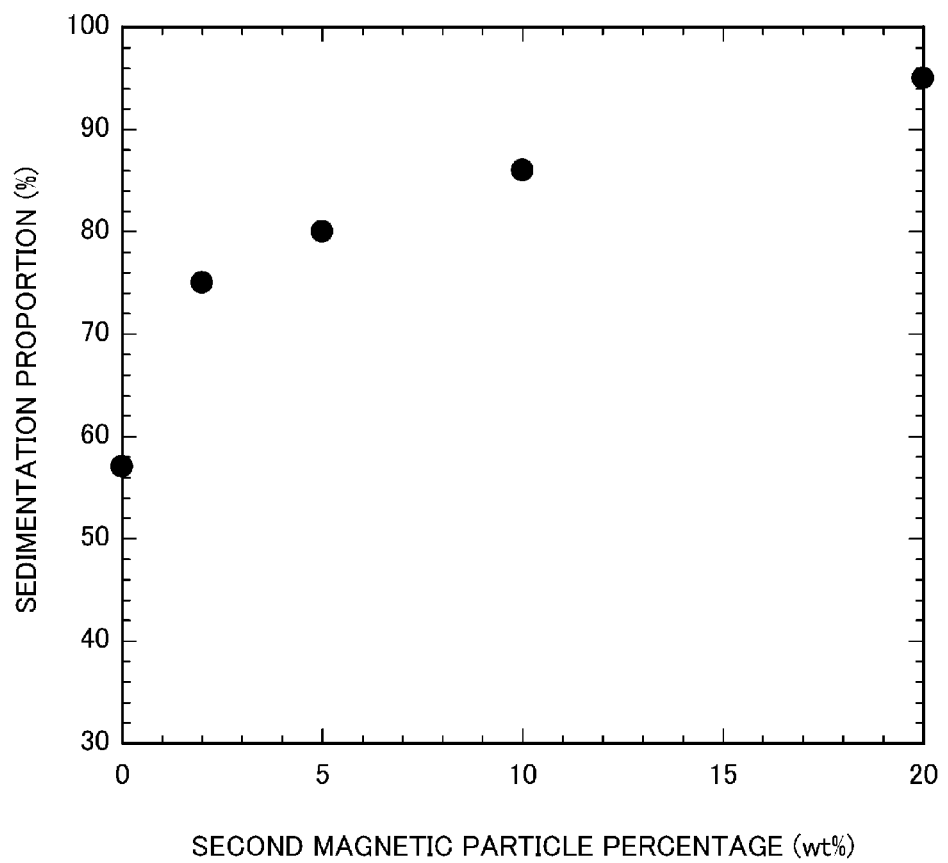
FIG. 9 is a graph showing results of sedimentation evaluation on MR fluids.

FIG. 9 shows results of measurement of sedimentation proportions on MR fluids A-E used for measuring the shearing stress. MR fluid A including no second magnetic particles showed a sedimentation proportion of 57%, but addition of the second magnetic particles greatly increased the sedimentation proportion. MR fluid B including 2 wt % of the second magnetic particles showed a sedimentation proportion of 75%, MR fluid C including 5 wt % of the second magnetic particles showed a sedimentation proportion of 80%, MR fluid D including 10 wt % of the second magnetic particles showed a sedimentation proportion of 86%, and MR fluid E including 20 wt % of the second magnetic particles showed a sedimentation proportion of 95%.

A magneto-rheological fluid according to the present disclosure can not only reduce sedimentation and secondary agglomeration of magnetic particles but also show a low shearing stress in a high shearing speed region. Thus, the magneto-rheological fluid is particularly useful as, for example, a magneto-rheological fluid to be used under high shearing speeds, and is applicable to clutches and other devices.

Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A magneto-rheological fluid comprising:
a magnetic particle mixture; and
a dispersion medium in which the magnetic particle mixture is dispersed,
wherein:
    the magnetic particle mixture includes first magnetic particles and second magnetic particles;
    the first magnetic particles have an average particle size greater than or equal to 1 μm and less than or equal to 50 μm;
    the second magnetic particles have an average particle size greater than or equal to 50 nm and less than or equal to 200 nm;
    a proportion of the second magnetic particles in the magnetic particle mixture is greater than or equal to 2 wt % and less than or equal to 10 wt %; and
    the second magnetic particles are magnetite particles.

2. The magneto-rheological fluid of claim 1, wherein the first magnetic particles are carbonyl iron powder.

3. The magneto-rheological fluid of claim 1, wherein the second magnetic particles have surfaces provided with a surface modified layer.

4. The magneto-rheological fluid of claim 3, wherein the surface modified layer includes a compound having a hydrocarbon chain bonded to the surfaces of the second magnetic particles.

5. A clutch comprising:
a first member and a second member which are configured to rotate relative to each other;
a magneto-rheological fluid filling a gap between the first member and the second member; and
a magnetic field generator configured to apply a magnetic field to the magneto-rheological fluid,
wherein the magneto-rheological fluid is the magneto-rheological fluid of claim 1.

6. A magneto-rheological fluid comprising:
a magnetic particle mixture; and
a dispersion medium in which the magnetic particle mixture is dispersed,
wherein:
    the magnetic particle mixture includes first magnetic particles and second magnetic particles;
    the first magnetic particles have an average particle size greater than or equal to 1 μm and less than or equal to 50 μm;
    the second magnetic particles have an average particle size greater than or equal to 50 nm and less than or equal to 200 nm;
    a proportion of the second magnetic particles in the magnetic particle mixture is greater than or equal to 2 wt % and less than or equal to 10 wt %; and
    the second magnetic particles are iron particles having an oxide film with a thickness of between 2 and 10 nm.

7. The magneto-rheological fluid of claim 6, wherein the first magnetic particles are carbonyl iron powder.

8. The magneto-rheological fluid of claim 6, wherein the second magnetic particles have surfaces provided with a surface modified layer.

9. The magneto-rheological fluid of claim 8, wherein the surface modified layer includes a compound having a hydrocarbon chain bonded to the surfaces of the second magnetic particles.

10. A clutch comprising:
a first member and a second member which are configured to rotate relative to each other;
a magneto-rheological fluid filling a gap between the first member and the second member; and
a magnetic field generator configured to apply a magnetic field to the magneto-rheological fluid,
wherein the magneto-rheological fluid is the magneto-rheological fluid of claim 6.

* * * * *